United States Patent
Hoyos

(10) Patent No.: US 10,250,597 B2
(45) Date of Patent: Apr. 2, 2019

(54) SYSTEMS AND METHODS FOR PERFORMING USER RECOGNITION BASED ON BIOMETRIC INFORMATION CAPTURED WITH WEARABLE ELECTRONIC DEVICES

(71) Applicant: VERIDIUM IP LIMITED, London (GB)

(72) Inventor: Hector Hoyos, New York, NY (US)

(73) Assignee: VERIDIUM IP LIMITED, London (GB)

( * ) Notice: Subject to any disclaimer, the term of this patent is extended or adjusted under 35 U.S.C. 154(b) by 0 days.

(21) Appl. No.: 14/845,805

(22) Filed: Sep. 4, 2015

(65) Prior Publication Data

US 2016/0072802 A1    Mar. 10, 2016

Related U.S. Application Data

(60) Provisional application No. 62/045,741, filed on Sep. 4, 2014.

(51) Int. Cl.
*H04L 29/06*        (2006.01)
*H04W 12/06*      (2009.01)
(Continued)

(52) U.S. Cl.
CPC .... *H04L 63/0861* (2013.01); *G06F 17/30867* (2013.01); *G06F 17/30876* (2013.01);
(Continued)

(58) Field of Classification Search
CPC .... H04L 63/0861; H04L 9/3231; G06F 21/32
See application file for complete search history.

(56) References Cited

U.S. PATENT DOCUMENTS 9,003,196 B2    4/2015 Hoyos
9,852,264 B1 *  12/2017 Srirama ............ G06F 19/3418
(Continued)

OTHER PUBLICATIONS

Nie, Zedong; Liu, Yuhang; Duan, Changjiang; Ruan, Zhongzhou; Li, Jingzhen; Wang, Lei; "Wearable Biometric Authentication Based on Human Body Communication", 12th International Conference on Wearable and Implantable Body Sensor Networks (BSN), IEEE, Jun. 9-12, 2015, 5 pages.*
(Continued)

*Primary Examiner* — Victor Lesniewski
(74) *Attorney, Agent, or Firm* — Leason Ellis LLP

(57) ABSTRACT

Systems and methods are disclosed herein for performing biometrics based user recognition and monitoring based on biometric information captured using wearable monitoring devices. More specifically, the present application provides systems including monitoring devices built into one or more articles of clothing that capture data relating to the wearer of the device and other subjects, such as biometric information, health vitals, environmental information, location data and the like. The systems also include a mobile computing device configured to receive the captured data from the monitoring device and, in conjunction with a distributed biometric authentication and identity assertion platform, perform user recognition based on biometric information captured by the mobile device and/or the monitoring device. The present application also provides an infrastructure for collecting and managing the data collected by the monitoring device in an authenticated/verified manner.

12 Claims, 7 Drawing Sheets

(51) Int. Cl.
    *H04B 1/3827*     (2015.01)
    *G06F 21/32*     (2013.01)
    *H04L 9/32*     (2006.01)
    *G06F 17/30*     (2006.01)

(52) U.S. Cl.
    CPC ............ *G06F 21/32* (2013.01); *H04B 1/385* (2013.01); *H04L 9/3231* (2013.01); *H04W 12/06* (2013.01)

(56) References Cited

U.S. PATENT DOCUMENTS

| | | | |
|---|---|---|---|
| 9,942,222 B1* | 4/2018 | Fenton | H04L 63/0853 |
| 2005/0225430 A1 | 10/2005 | Seifert | |
| 2006/0181421 A1 | 8/2006 | Forcier et al. | |
| 2006/0288234 A1* | 12/2006 | Azar | G06F 21/32 |
| | | | 713/186 |
| 2008/0129465 A1* | 6/2008 | Rao | A61B 5/0031 |
| | | | 340/286.02 |
| 2008/0216171 A1* | 9/2008 | Sano | H04L 9/32 |
| | | | 726/19 |
| 2009/0150993 A1* | 6/2009 | Tilley | G06F 21/32 |
| | | | 726/19 |
| 2012/0054842 A1* | 3/2012 | Urios Rodriguez | G06F 21/32 |
| | | | 726/6 |
| 2012/0066221 A1 | 3/2012 | Behzad et al. | |
| 2012/0154117 A1* | 6/2012 | Nice | G06F 21/32 |
| | | | 340/5.82 |
| 2013/0285836 A1* | 10/2013 | Proud | H01F 38/14 |
| | | | 340/870.02 |
| 2014/0085050 A1 | 3/2014 | Luna | |
| 2014/0188770 A1 | 7/2014 | Agrafioti et al. | |
| 2014/0195815 A1* | 7/2014 | Taveau | G06F 21/32 |
| | | | 713/186 |
| 2014/0247156 A1* | 9/2014 | Proud | H02J 7/025 |
| | | | 340/870.16 |
| 2014/0277653 A1* | 9/2014 | Watts | G06F 3/165 |
| | | | 700/94 |
| 2014/0337949 A1 | 11/2014 | Hoyos | |
| 2014/0341441 A1* | 11/2014 | Slaby | G06F 21/32 |
| | | | 382/117 |
| 2015/0035643 A1* | 2/2015 | Kursun | G07C 9/00158 |
| | | | 340/5.52 |
| 2015/0088547 A1* | 3/2015 | Balram | G06F 19/322 |
| | | | 705/3 |
| 2015/0142686 A1* | 5/2015 | Baldwin | G06Q 50/265 |
| | | | 705/325 |
| 2015/0163221 A1* | 6/2015 | Bolin | G07C 9/00309 |
| | | | 726/7 |
| 2015/0182128 A1* | 7/2015 | Magi | A61B 5/0205 |
| | | | 340/539.12 |
| 2015/0186636 A1* | 7/2015 | Tharappel | G06F 21/32 |
| | | | 726/8 |
| 2015/0261946 A1* | 9/2015 | Yoon | G06F 21/34 |
| | | | 726/19 |
| 2015/0278495 A1* | 10/2015 | Yu | G06F 21/32 |
| | | | 713/186 |
| 2015/0288687 A1* | 10/2015 | Heshmati | H04L 63/0861 |
| | | | 726/7 |
| 2015/0304322 A1* | 10/2015 | Zaidi | G06K 9/00892 |
| | | | 382/115 |
| 2015/0350200 A1* | 12/2015 | Li | H04L 63/0861 |
| | | | 726/8 |
| 2015/0378433 A1* | 12/2015 | Savastinuk | G06K 9/00255 |
| | | | 345/156 |
| 2016/0004224 A1* | 1/2016 | Pi | G04G 21/025 |
| | | | 368/10 |
| 2016/0019423 A1* | 1/2016 | Ortiz | G06K 9/00885 |
| | | | 345/633 |
| 2016/0050204 A1* | 2/2016 | Anderson | H04L 63/0876 |
| | | | 726/4 |
| 2016/0051191 A1* | 2/2016 | Miller | A61B 5/681 |
| | | | 600/300 |
| 2016/0063235 A1* | 3/2016 | Tussy | G06F 21/32 |
| | | | 726/6 |
| 2016/0080888 A1* | 3/2016 | Kreitzer | H04B 1/385 |
| | | | 455/39 |
| 2016/0134609 A1* | 5/2016 | Durham | H04L 63/08 |
| | | | 726/7 |
| 2016/0191511 A1* | 6/2016 | Tijerina | H04L 63/0853 |
| | | | 726/7 |
| 2016/0314185 A1* | 10/2016 | Buchanan | G06F 17/30598 |

OTHER PUBLICATIONS

Yang, Junshuang; Li, Yanyan; Xie, Mengjun; "MotionAuth: Motion-based Authentication for Writst Worn Smart Devices", International Conference on Pervasive Computing and Communication Workshops (PerCom Workshops), IEEE, Mar. 23-27, 2015, pp. 550-555.*

* cited by examiner

SYSTEMS AND METHODS FOR PERFORMING USER RECOGNITION BASED ON BIOMETRIC INFORMATION CAPTURED WITH WEARABLE ELECTRONIC DEVICES

CROSS-REFERENCE TO RELATED APPLICATIONS

The present application is related to and includes U.S. Patent Application Ser. No. 62/045,741, entitled "SYSTEMS AND METHODS FOR WEARABLE ELECTRONIC DEVICES" filed on Sep. 4, 2014.

FIELD OF THE INVENTION

The present application relates to wearable technology, and in particular, systems and methods for system for biometrics based user recognition and monitoring using digital data collected by wearable monitoring devices.

BACKGROUND OF THE INVENTION

Wearable technology is a developing field that can combine electronic devices with conventional wearable accessories such as a watch or glasses. While some pieces of wearable technology have resulted in commercial success, current wearable technologies still lack convenience for everyday use. In particular, while current wearable technologies, e.g. arm bands, augmented reality glasses and smart watches, can be advantageous for a consumer when they are worn, consumers do not want to wear them all the time as they might be inconvenient or obtrusive. As such, there is a need for a wearable technology that can be worn everyday without being cumbersome to the consumer. Moreover, there is a need for systems that integrate such wearable technology into biometrics based user recognition and biometric monitoring systems.

SUMMARY OF THE INVENTION

Figure 1A:
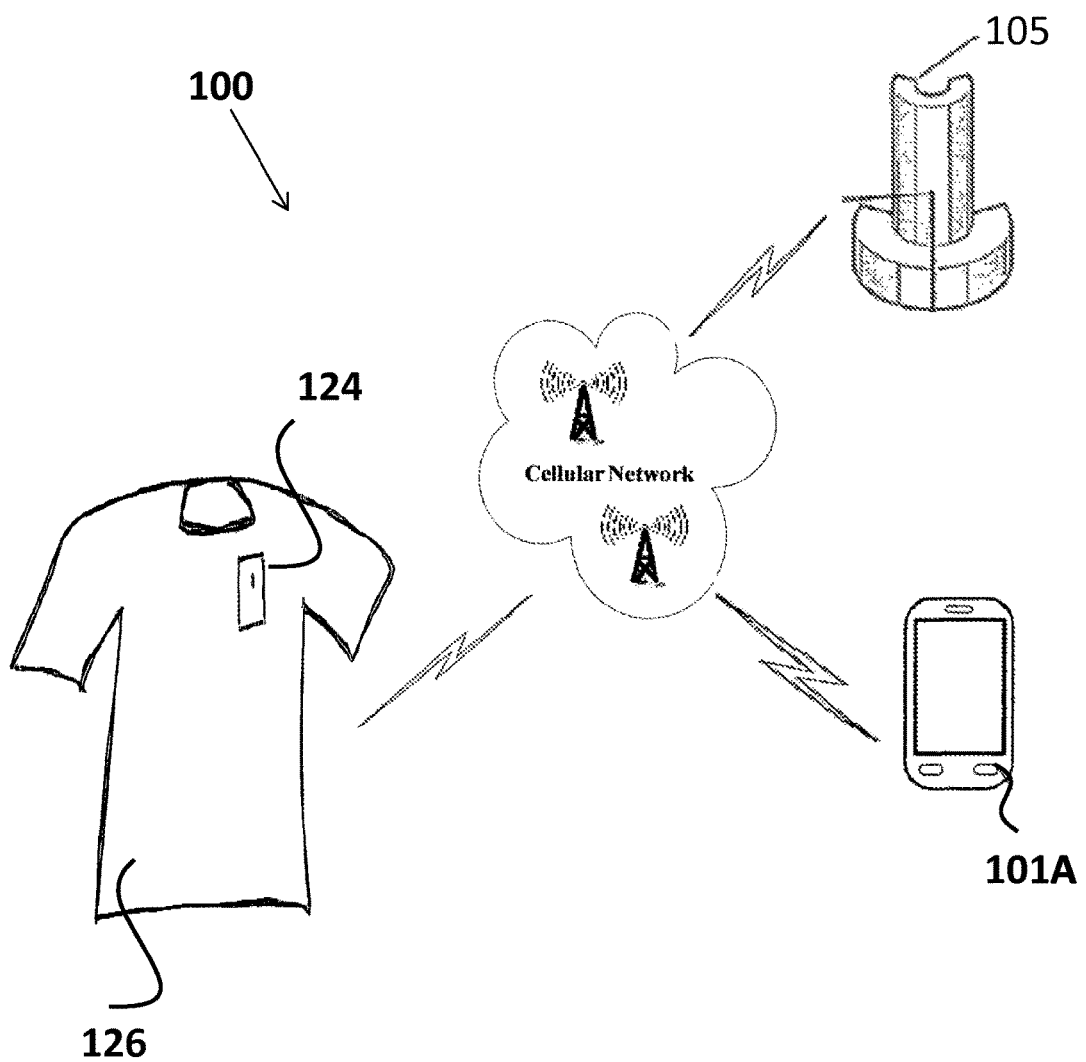
FIG. 1A is a high-level diagram of an exemplary wearable article that includes a MEMS-based monitoring device and a system for transmitting data from the wearable article in accordance with at least one embodiment disclosed herein.

Technologies are presented herein in support of a system and method for biometrics based user recognition and monitoring using digital data collected by wearable monitoring devices. According to a first aspect, a computer implemented method for performing user recognition with a mobile computing device according to biometric information captured by a monitoring device worn by a user is provided. The method includes the steps of detecting, by a mobile computing device that includes a processor, a wireless transceiver, a storage medium, and instructions stored on the storage medium and executing in the processor, a wearable monitoring device in range of the transceiver. The method also includes establishing a wireless communication link with the monitoring device. The method also includes receiving, by the processor over the wireless communication link, a monitoring device ID and monitoring data captured by the monitoring device. In particular, the monitoring data includes captured biometric data of at least one subject. The method also includes analyzing, by the mobile device processor, at least the received biometric data. In particular, the analysis includes steps for extracting biometric features of a type that is suitable for performing biometric user recognition, and generating a biometric identifier using the extracted biometric features. The method also includes recognizing, by the mobile device and/or a remote server computing device, a user identity that corresponds to the biometric identifier. In particular, the recognizing step includes comparing the biometric identifier to one or more enrolled biometric identifiers which are stored in a database. The recognizing step also includes identifying the user identity in response to a successful match of the biometric identifier to an enrolled biometric identifier that is associated with the user identity. In addition, the method also includes creating a record in a database, wherein the record includes the result of the recognizing step and the device ID associated with the monitoring device. The method also includes transmitting, by the remote server over a network to a remote computing device, a confirmation indicating that the record entry was created and the result of the identifying step.

According to another aspect, a system is provided for performing user recognition according to biometric information captured by a monitoring device worn by a user. The system includes a remote server computing device and a database maintained by the remote server, wherein the database includes enrolled biometric identifiers associated with respective user identities. The system also includes a mobile computing device having a processor, a wireless transceiver, a storage medium. Also stored on the storage medium are instructions that are executable by the processor. The one or more software modules include a communication module that configure the processor to, using the transceiver, establish a wireless communication link with the monitoring device, receive a monitoring device ID and monitoring data captured by the monitoring device including biometric data of at least one subject. The software modules also include an analysis module that configure the processor to analyze at least the received biometric data, extract biometric features and generate a biometric identifier using the extracted biometric features. The software modules also include an authentication module executing in the processor and configuring the processor to, in coordination with the remote server computing device, identify a user identity that corresponds to the biometric identifier by comparing the biometric identifier to one or more enrolled biometric identifiers stored in the database, and identifying the user identity in response to a successful match of the biometric identifier to an enrolled biometric identifier that is associated with the user identity. In addition, the software modules also include a database that configure the processor to, in coordination with the remote server, create a record in the database, wherein the record includes a result of the recognizing step and the device ID.

DETAILED DESCRIPTION

In accordance with one or more embodiments of the present application, disclosed herein are a device, system and methods for biometrics based user recognition and monitoring using wearable monitoring devices. More specifically, in at least one embodiment, the present application provides a device built into one or more articles of clothing, wherein the device can record and transmit data about and/or related to the wearer of the device, such as the wearer's biometric information, health vitals, environmental information and location data or similar information relating to individuals that are proximate to the wearable device. In one or more embodiments, the device can comprise Micro-electro-mechanical devices (MEMS). In at least one embodiment, the MEMS devices are incorporated into fabric or other such textiles that are useable to create articles of clothing and other such wearable items. The present application also provides an infrastructure for collecting and managing the data collected by the MEMS devices and that includes a biometric authentication and identity assertion platform.

MEMS is a technology regarding very small devices with electromechanical and mechanical capabilities that can be produced via one or more techniques of microfabrication. MEMS fall within a number of categories sensors, actuators, and microelectronics/processors. As would be understood by those in the art, MEMS microprocessors are configured to process data and can be communicatively coupled with microsensors and microactuators and other electronic components. Sensors can be configured to gather information relating to the environment through measuring mechanical, thermal, biological, chemical, optical, and magnetic phenomena. Microactuators can be configured to move, position, regulate, pump, and filter, and the like, thereby allowing microsystems to sense and/or control an environment.

MEMS are made up of components between 1 to 100 micrometers in size (i.e. 0.001 to 0.1 mm), and MEMS devices generally range in size from 20 micrometers (20 millionths of a meter) to a millimeter (i.e. 0.02 to 1.0 mm). MEMS are commonly made up of thin films of materials and most MEMS-based devices are built on small silicon wafers, however, MEMS can be made from metals and ceramics and from polymers, for example, by processes such as injection molding, embossing or stereolithography. By way of further example, MEMS can be fabricated on silicon-based flexible skins and integrated into wearable articles of clothing accessories and the like. Accordingly, it can be appreciated that due to the small size and wide variety of functional and physical characteristics (e.g., size and durability, rigidity/flexibility, etc.) MEMS are suitable for incorporation into textiles for use in clothing and other wearable personal articles.

As would be understood by those in the art, MEMS microsensors can be used to collect data related to numerous fields of study. In certain instances, the MEMS microsensors can include accelerometers, gyroscopes, digital compasses, magnetometers, gyroscopes, inertial modules, pressure sensors, humidity sensors and microphones and temperature sensors, and the like. It would also be understood that MEMS and non-MEMS microsensors can also include image sensors configured to capture imagery in various light spectrums including the visible, near infra-red and infra-red spectral bands.

Accordingly, it can be appreciated that MEMS microsensors integrated into clothing can be used to capture information concerning a user and his surrounding, for example, environmental data (e.g., temperature, pressure, etc.), biological data, chemical data, location data, and health vitals data, among other things.

In one or more embodiments, MEMS monitoring device can be configured to include components for Micro-scale Energy harvesting comprising piezoelectric, electrostatic and electromagnetic micro-harvesters capable of converting one form of energy to another form of energy, as would be understood by those skilled in the art. Accordingly, a power source for the MEMS-based monitoring device may be augmented or even replaced by incorporating Micro-scale Energy harvesting components to use or convert energy in the form of vibrations, movement, heat or ambient light.

As would be understood by those in the art, there also exist MEMS-based data communications devices for communicatively coupling the MEMS to external electronic devices, and memory devices for the storage of data. In one or more embodiments, MEMS monitoring device can be configured to include a local RF communication circuit, or some other type of short range RF communication receiver or transmitter or transceiver for communicating with a remote electronic device.

Unlike the present wearable technology in which the electronic device is a part of an accessory such as a bracelet, or watch, or glasses, the present application provides a monitoring device that can be an integral part of an article of clothing worn by a user.

FIG. 1A depicts a high-level diagram of an exemplary wearable article that includes a MEMS-based monitoring device and a system for managing data from the wearable article. In one or more embodiments, the system 100 can include a monitoring device 124 disposed on a wearable article of clothing 126, a user device 101*a* and a system server 105. The system server 105 can be practically any computing device and/or data processing apparatus capable of communicating with the user device 101*a*, the monitoring device 124, and/or remote computing devices and receiving, transmitting and storing electronic information and processing requests as further described herein. Further, the monitoring device 124 is capable of communicating with the user device 101*a*.

Figure 1B:
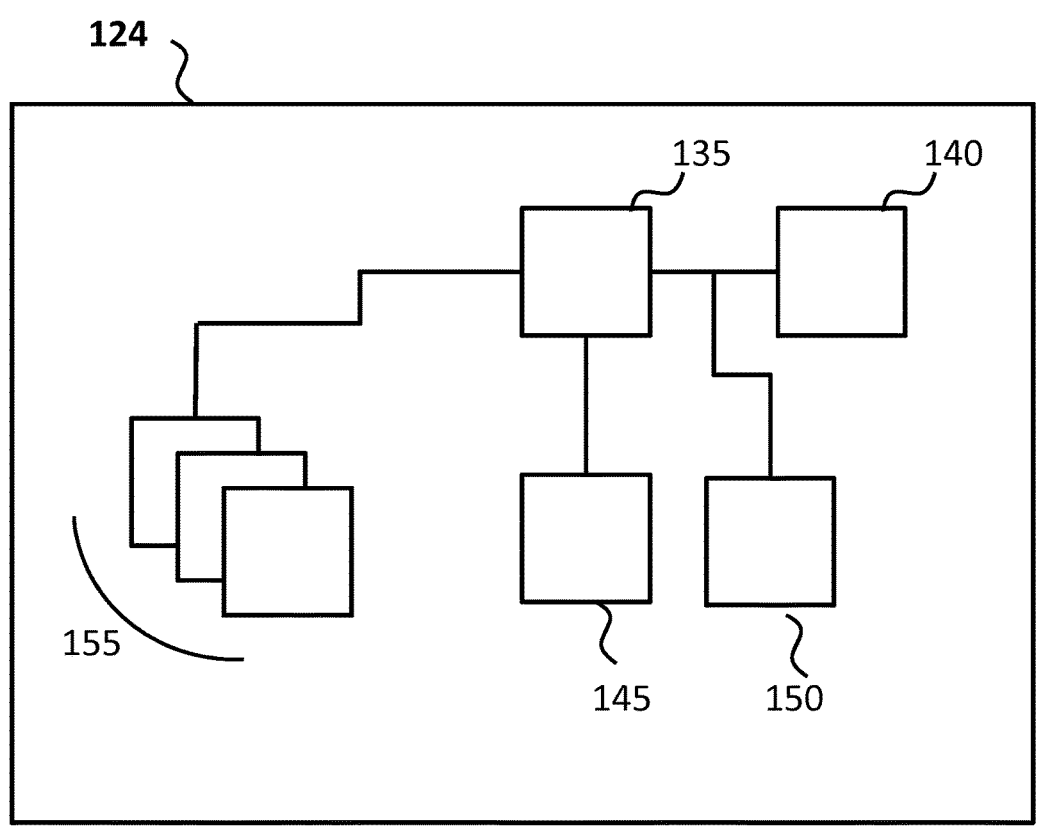
FIG. 1B is a high-level diagram of a MEMS-based monitoring device in accordance with at least one embodiment disclosed herein.

FIG. 1B is a high-level diagram of a MEMS-based monitoring device in accordance with at least one embodiment disclosed herein. In one or more embodiments, the monitoring device 124 of the present application comprises one or more MEMS-based components, including a microprocessor 135, a power source 140, a storage medium 145 for storing data captured by the microsensors, a communication circuit 150 and one or more microsensors 155. The various components can be integrated into a single unit or can be integrated into the wearable article remote from one another and communicatively coupled, for example, using conductive threads and other such components. In one or more embodiments, the monitoring device is communicatively coupled to a user's mobile device using the communication device. It can be appreciated that other configurations and combinations of MEMS-based components are envisioned in accordance with the exemplary embodiments.

In one or more embodiments, the one or more microsensors can be used to capture the user's health vital signs. The health vital signs can include but are not limited to the user's pulse, heart rate, and temperature and can be monitored using, for example and without limitation, pressure sensors, humidity sensors, microphones and temperature sensors.

In one or more embodiments, one or more microsensors can be used to track the movements of the user and/or location of the user. For example, in one or more embodiments, the microsensors can track the type, duration, and/or intensity of a user's movement over a period of time using an accelerometer, gyrometer, digital compasses, magnetometers, gyroscopes, inertial sensor modules.

Further, in one or more embodiments, one or more microsensors can capture environmental data for the area surrounding the user, such as temperature, humidity, and barometric pressure using, for example, pressure sensors, humidity sensors and temperature sensors.

The MEMS microsensor(s) and microprocessor(s) of the present invention can capture and process data via methods known in the art and store the data in a storage medium and/or transmit the data to the user device.

In one or more embodiments, the device of the present application can be integrated into one or more articles of clothing. In one or more embodiments, the device can be integrated into various aspects of clothing, including but not limited to fabric, threads, and buttons. Further, the device can be integrated in various articles of clothing, including but not limited to shirts, pants, jackets, ties, and shoes, glasses hats and the like. Because of the small size of the device, the device can be integrated into an article of clothing without noticeably impacting the size, feel, and/or weight of the article of clothing. More specifically, in at least one embodiment, the device can be manufactured to match the size and/or density of linen, threads, buttons, or other parts of clothing articles.

In one or more embodiments, the data captured by the microsensor(s) can be transmitted to a user's electronic device that is configured by executing a client application (referred to as the client app). Client app refers generally to an application for user computing devices that are configured to collect, process and manage the data received from the wearable MEMS device(s) integrated into the monitoring device 124. In some implementations, the user device is a mobile device (e.g., smartphone) and the exemplary systems and methods are described herein in the context of a user's mobile device, however, it can be appreciated that the data captured by the microsensors from the wearable technology of the present invention can be communicatively coupled to a variety of electronic device(s) executing the client app (e.g., a user's smartphone, tablet computer, laptop computer, desktop computer and other stationary computing device nodes) for the purpose of user recognition (e.g., user authentication or identification), data recording and monitoring.

In one or more embodiments, the mobile device can be configured to store the data received from the wearable MEMS device(s). Before or after receiving the data, the mobile device can be used to authenticate or identify the user, and after receipt, display the data to the user of the mobile device and/or transmit the data to one or more other devices.

In one or more embodiments, biometric authentication can be accomplished independent of the monitoring device data. In one or more embodiments biometric authentication of the user can performed using, or otherwise supplemented using data collected by the monitoring device 124. For example, biological data (e.g., heart rhythms), or behavioral data (e.g., motion data) captured by the MEMS microsensors can be analyzed to identify, during an enrollment period, a baseline of biometric characteristics that are unique to the user and useable as a biometric identifier for the user. Accordingly, information captured by the microsensors at a later time can be compared to the baseline to authenticate the user.

Moreover, in one or more implementations, the one or more microsensors can capture information concerning individuals other than the particular person wearing the monitoring device 124 including without limitation, biometric information, such as health vital signs and other information suitable to biometrically recognize the individual in proximity to the wearable microsensor(s). For instance, the monitoring device 124 can include a plurality of MEMS based microsensors configured to capture IR imagery. The microsensors can be exposed on an external surface of a wearable garment, for instance positioned at various locations on a garment sleeve, so as to capture IR imagery of the user wearing the garment. In addition or alternatively the MEMS devices can be configured to capture imagery of other individuals. The IR imagery can be captured by the multiple sensors and stored by the monitoring device 124 and, as further described herein, during subsequent biometric monitoring or authentication procedures, combined so as to generate an accurate biometric identifier (e.g., an iris biometric identifier, facial biometric identifier) for the subject.

In one or more embodiments, the mobile device can be configured to biometrically authenticate the user (based on biometrics captured using the mobile device and/or the monitoring device 124) using the client app in conjunction with a distributed biometric authentication platform. For example and without limitation, a biometrics-based identity assertion and data management and access management platform, is more fully described herein and in co-pending and commonly assigned U.S. Pat. No. 9,003,196, entitled "SYSTEM AND METHOD FOR AUTHORIZING ACCESS TO ACCESS-CONTROLLED ENVIRONMENTS" filed May 13, 2014 and issued on Apr. 7, 2015, which is hereby incorporated by reference as if set forth in its entirety herein.

Authentication is accomplished using the biometric features of the user that have been captured or otherwise obtained by the mobile device, which is further integrated with the back-end infrastructure of the distributed biometric authentication platform. For example, the distributed biometric authentication system can utilize a camera device that is configured with or that operates in conjunction with enrolled electronic devices that capture a user's biometric information. In one or more implementations, the distributed biometric authentication platform includes facial recognition technology, iris recognition technology or fingerprint recognition technology to authenticate a user as well as to provide a user with biometric security for his or her digital data (e.g., location data, user activity data, biometric data as well as content such as videos, documents etc.) and/or authenticated access to an access controlled system. In addition, biometric information can be analyzed to assure liveness (e.g., prevent the spoofing of a user's identity)—a problem associated with each of these technologies in isolation. In one or more embodiments, distributed biometric authentication platform can also implement additional "liveness" detection systems to verify that a "real person" is being recognized and/or trying to access the system and/or complete a secure electronic transaction. It can be appreciated that any of a variety of biometric modalities, alone or in combination, can be used for user recognition and determining liveness in accordance with the exemplary embodiments of the present invention, for example, face, iris, periocular, fingerprints, voice, vein pattern and the like, as the distributed biometric authentication platform is not limited by the biometric in question.

In one or more implementations, the distributed biometric authentication platform can also support Biometric Open Protocol Standards (BOPS). As used herein, the term "BOPS" generally encompasses rules governing secure communication between various enrolled electronic devices and/or a server, as more fully described in co-pending and commonly assigned U.S. Provisional Patent Application Ser. No. 61/922,438, entitled "SYSTEM AND METHOD FOR BIOMETRIC PROTOCOL STANDARDS" filed Dec. 31, 2013, which is hereby incorporated by reference as if set forth in its entirety herein. In particular, in one or more implementations, the architecture of BOPS can enable a two-way secure slocketlayer (SSL)/transport layer security (TLS) connection over an encryption mechanism between a mobile device and a server, which can also employ an intrusion detection system.

Figure 2A:
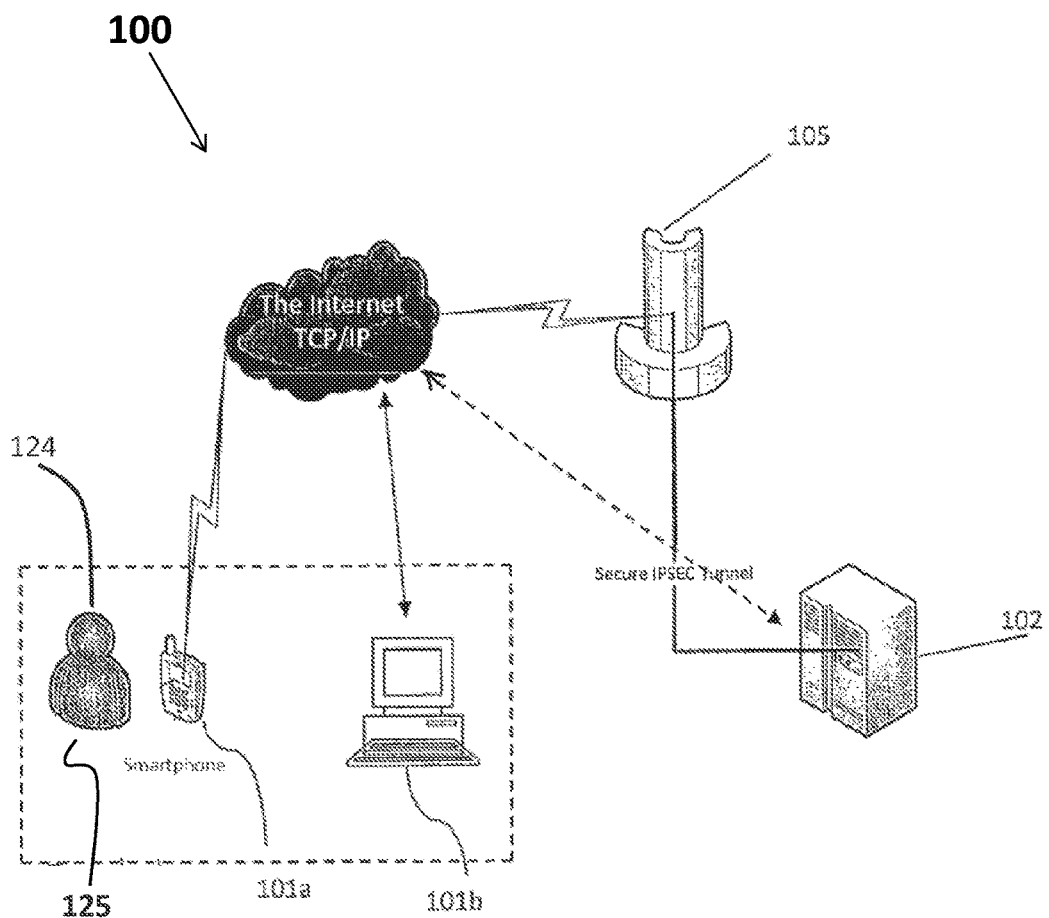
FIG. 2A is a high-level diagram of a system for biometrics based user recognition and monitoring using wearable monitoring devices in accordance with at least one embodiment disclosed herein.

An exemplary system 100 for biometrics based user recognition and monitoring using wearable monitoring devices 100 in accordance with one or more embodiments is shown as a high-level block diagram in FIG. 2A. In one arrangement, the system 100 consists of a system server 105, the monitoring device of the present application 124 being worn by the user 125, and one or more user devices including a mobile device 101a and a computing device 101b. The computing device 101b can be associated with the user 125, or can be associated with another user or entity that is utilizing/implementing the distributed biometric monitoring system using wearable biometric monitoring devices. The system 100 can also include one or more remote computing devices 102. In FIG. 2A, the monitoring device 124, and the mobile devices 101a belong to the same user; however, it should be understood that in one or more embodiments, the mobile devices 101a can be devices of one or more other users, separate from the user of the monitoring device 124.

The system server 105 can be practically any computing device and/or data processing apparatus capable of communicating with the user facing devices and remote computing devices and receiving, transmitting and storing electronic information and processing requests as further described herein. As described above, the monitoring device 124 can be configured capture and process and store microsensor data and communicate with mobile device 101a, transmitting electronic information thereto and receiving electronic information therefrom as further described herein. In some implementations, the monitoring device 124 can also be configured to receive user inputs. The computing devices including mobile device 101a and computing device 101b can be any mobile computing devices and/or data processing apparatus capable of embodying the systems and/or methods described herein, including but not limited to a personal computer, tablet computer, personal digital assistant, mobile electronic device, cellular telephone or smart phone device and the like. It can also be appreciated that mobile device 101a can be other types of smart technology devices, such as smart watches, glasses and other such smart accessory devices that are capable of receiving user inputs, outputting information to the user, executing the client app and communicating/integrating directly or indirectly with the system server 105.

It should be noted that while FIG. 2A depicts the system 100 with respect to a mobile device 101a and a user computing device 101b and a remote computing device 102, it should be understood that any number of such devices can interact with the system in the manner described herein. Moreover, it can be appreciated that any number of users can be biometrically monitored and/or identified/authenticated based on biometric information captured using the monitoring device 124 in conjunction with the mobile device 101a or computing device 101b, as further described herein. In certain implementations the referenced devices and machines, and their associated and/or accompanying operations, features, and/or functionalities can be combined or arranged or otherwise employed across any number of such devices and/or machines, such as over a network connection or wired connection, as is known to those of skill in the art. For example, user authentication and user data collection can be performed exclusively using the mobile device and without incorporation of the system server 105. By way of further example, user authentication and data collection can be performed by the mobile device 101a in conjunction with the system server 105.

Figure 2B:
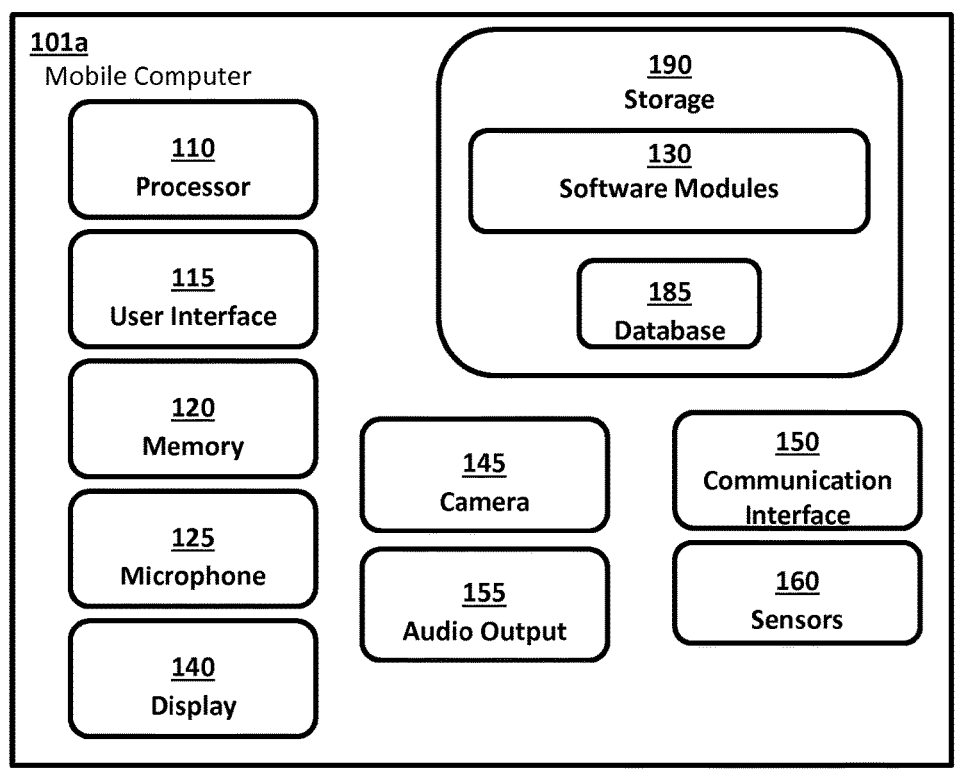
FIG. 2B a block diagram of a computer system for performing biometrics based user recognition and monitoring using wearable monitoring devices in accordance with at least one embodiment disclosed herein.

FIG. 2B depicts an exemplary block diagram of the mobile computing device 101a for use with the system for biometrics based user recognition and monitoring using wearable monitoring devices 100. It should be understood that the hardware and software configuration of the computing device 101b is comparable to the mobile device described herein. The mobile device can include various hardware and software components that serve to enable operation of the system 100 including one or more processors 110, a memory 120, a microphone 125, a display 140, one or more cameras 145, an audio output 155, a storage 190 and a communication interface 150.

Processor 110 serves to execute the client app including software instructions in the form of executable code that can be loaded into memory 120. Processor 110 can be a number of processors, a central processing unit CPU, a graphics processing unit GPU, a multi-processor core, or any other type of processor, depending on the particular implementation.

Preferably, the memory 120 and/or the storage 190 are accessible by the processor 110, thereby enabling the processor to receive and execute instructions encoded in the memory and/or on the storage so as to cause the mobile device and its various hardware components to carry out operations for aspects of the systems and methods, as will be described in greater detail below. Memory can be, for example, a random access memory (RAM) or any other suitable volatile or non-volatile computer readable storage medium. In addition, the memory can be fixed or removable. The storage 190 can take various forms, depending on the particular implementation. For example, the storage can contain one or more components or devices such as a hard drive, a flash memory, a rewritable optical disk, a rewritable magnetic tape, or some combination of the above. Storage also can be fixed or removable.

Figure 2C:
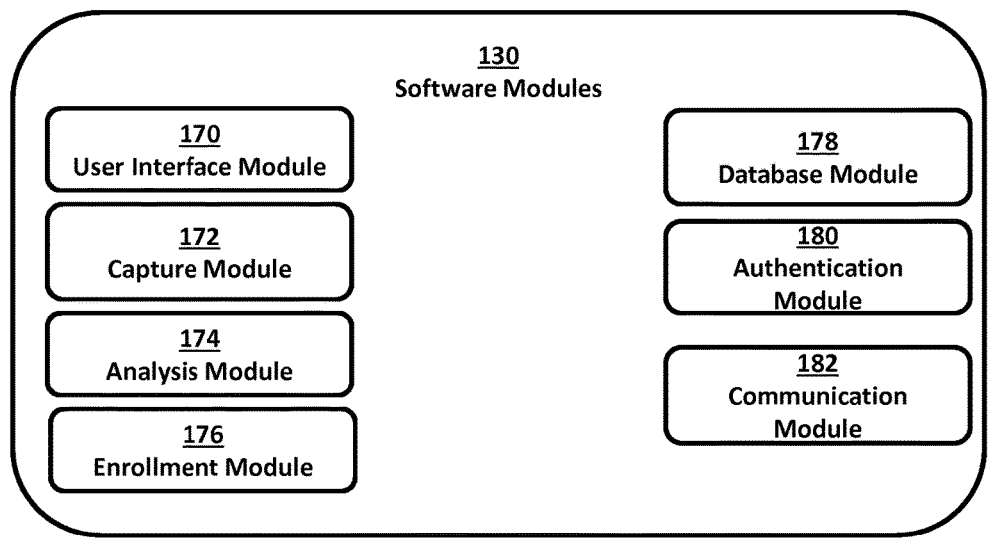
FIG. 2C a block diagram of computer software modules for performing biometrics based user recognition and monitoring using wearable monitoring devices in accordance with at least one embodiment disclosed herein.

One or more software modules 130 are encoded in the storage 190 and/or in the memory 120. The software modules 130 can comprise one or more software programs/applications (referred to as the "client app") having instructions in the form of code. The code can be written in any combination of one or more programming languages and are executable in the processor and, when executing in the processor 110, configure the processor to carry out various operations, as further described herein. As depicted in FIG. 2C, preferably, included among the software modules 130 is a user interface module 170, a biometric capture module 172, an analysis module 174, an enrollment module 176, a database module 178, an authentication module 180 and a communication module 182.

The program code can execute entirely on the mobile device 101a, as a stand-alone software package, partly on the mobile device and a remote device, such as, the system server 105. In the latter scenario, the remote computer can be connected to the mobile device through a network, including a local area network (LAN) or a wide area network (WAN), mobile communications network, cellular network, or the Internet using an Internet Service Provider.

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It can also be appreciated that the modules are not required to be stored locally by the mobile device and can be stored in a distributed manner. It should be understood that in some illustrative embodiments, one or more of the software modules 130 can be downloaded over a network to storage 190 from another device or system via communication interface 150 for use within the system 100. In addition, it should be noted that other information and/or data relevant to the operation of the present systems and methods (such as database 185) can also be stored on storage.

In some implementations, sensitive user information can be stored on an encrypted data-store that is specifically allocated so as to securely store information collected or generated by the processor executing the secure authentication application. Encryption measures can be used to store the information locally on the storage and to transmit information to remote computing device. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

Also preferably stored on storage 190 is database 185. As will be described in greater detail below, the database contains and/or maintains various data items and elements that are utilized throughout the various operations of the system and method biometrics based user recognition and monitoring using wearable monitoring devices 100. The information stored in database can include but is not limited to a user profile, as will be described in greater detail herein. It should be noted that although database is depicted as being configured locally to the mobile device, in certain implementations the database and the various data elements stored therein can, in addition or alternatively, be located remotely (such as on system server 105—not shown) and connected to on-board computer through a network in a manner known to those of ordinary skill in the art.

A user interface 115 is also operatively connected to the processor 110. The interface can be one or more input or output device(s) such as switch(es), button(s), key(s), a touch-screen, microphone, etc. as would be understood in the art of electronic computing devices and in-vehicle computing devices. User Interface serves to facilitate the capture of commands from the user such as an on-off commands or user information and settings related to operation of the disclosed embodiments. For example, interface serves to facilitate the capture of certain information from the user such as personal user information for enrolling with the system, during user authentication and during normal operation and use of the system 100.

A display 140 can also be operatively connected to the processor 110. The display includes a screen or any other such presentation device which enables the system to instruct or otherwise provide feedback to the user regarding the operation of the vehicle and on-board computer. By way of example, the display can be a digital display such as a dot matrix display or other 2-dimensional display. By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the person to interact with the device to enter data, change settings, control functions, etc. So, when the touch screen is touched, user interface communicates this change to processor, and settings can be changed or user entered information can be captured and stored in the memory.

A camera 145 is also operatively connected to the processor 110. The camera serves to facilitate the capture of images of the user. In some implementations, the camera 145 can include one or more visible light cameras (e.g., cameras commonly found on consumer devices and having a sufficient resolution), near infra-red cameras configured to capture NIR images of a user, infra-red cameras and thermal infra-red cameras or a combination of the foregoing. In addition, as further described herein, imagery can be captured using one or more imaging devices that are external to the mobile device for instance, imaging devices incorporated into monitoring device 124 configured to communicatively couple with the mobile device.

In some implementations, the imagery is captured for the purpose of biometrically identifying/authenticating the user from the images. In addition the cameras can capture imagery of the user of the mobile device 101a or monitoring device 124 or proximate individuals for the purpose of monitoring the captured subject by the mobile device including, detecting facial features, expressions, movement, body-language, monitoring vital signs and other biometric features for the purpose of recognition and indicators of various biometric conditions. For instance, a thermal IR camera can be used to capture imagery of one or more user in proximity to the imaging device(s) that are useable by the processor to detect biometric features for purposes of identification, core body temperature, heart-rate, biometric rhythms, biometric features etc. Visible light or NIR and IR cameras can be used to detect pupil dilation (e.g., for detecting altered state/intoxication), eyes-closing (e.g. biometric signs of sleepiness), monitor vital signs like pulse and respiratory rate, detect facial expressions (e.g., to detect mood/behavior) and the like.

The processor 110 and/or the camera 145 can also be communicatively coupled to one or more light or signal emitters (not shown) for illuminating a subject during image capture, for example, visible light, infra-red or near-infra-red light emitters and the like.

Audio output 155 is also operatively connected to the processor 110. Audio output can be any type of speaker system that is configured to play electronic audio files as would be understood by those skilled in the art. Audio output can be integrated into the mobile device 101a or external to the mobile device 101a. In addition, the mobile device can also include one or more microphones 104 for capturing audio recordings as would be understood by those skilled in the art.

Various additional hardware devices/sensors 160 can also be operatively connected to the processor. The sensors 160 can include: an on-board clock to track time of day, etc.; a GPS enabled device to determine a location of the mobile device; an accelerometer to track the orientation and acceleration of the device or associated vehicle; gravity magnetometer; proximity sensors; RF radiation sensors, temperature gauges and other such sensors that are commonly found in mobile devices, on-board computers, as would be understood by those skilled in the art. Various hardware devices and sensors can also be located externally to the mobile device such as the sensors previously described in relation to the monitoring device 124 which is configured to communicate with the processor and provide sensed information to the mobile device 101a.

Communication interface 150 is also operatively connected to the processor 110 and can be any interface that enables communication between the mobile device 101a and external devices, machines and/or elements including system server 105 and the monitoring device 124. Preferably, communication interface includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the mobile device to other computing devices and/or communication networks such as private networks and the Internet. Such connections can include a wired connection or a wireless connection (e.g. using the 802.11 standard) though it should be understood that communication interface can be practically any interface that enables communication to/from the mobile device.

Figure 2D:
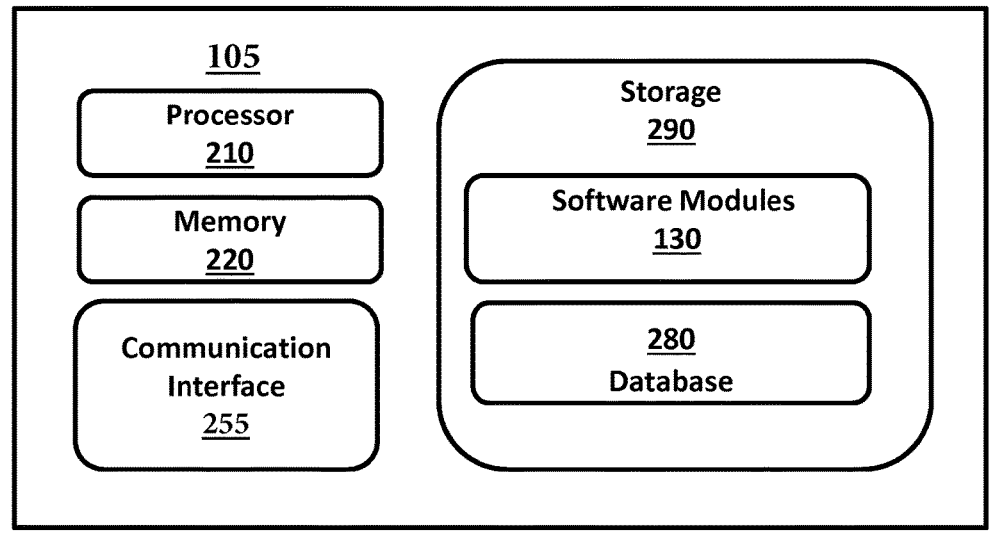
FIG. 2D a block diagram of a computer system for performing biometrics based user recognition and monitoring using wearable monitoring devices in accordance with at least one embodiment disclosed herein.

FIG. 2D is a block diagram illustrating an exemplary configuration of system server 105. System server 105 can include a processor 210 which is operatively connected to various hardware and software components that serve to enable secure operation of the system for facilitating secure authentication of transactions at a terminal 100. The processor 210 serves to execute instructions to perform various operations relating to biometrics based user recognition and monitoring using wearable monitoring devices as will be described in greater detail below. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software programs or applications (referred to as the "secure authentication server application") comprising instructions in the form of code that is executable by the processor 210 can be encoded in the storage 290 and/or in the memory 220. For example, the server application can include software modules 130 (depicted in FIG. 2B) and the modules 130 can execute entirely on the system server 105 as a stand-alone software package, partly on the system server 105 and partly on a remote computing device, such as a remote computing device 102, mobile device 101a and/or computing device 101b, or entirely on such remote computing devices.

Also preferably stored on the storage 290 is a database 280. As will be described in greater detail below, the database 280 contains and/or maintains various data items and elements that are utilized throughout the various operations of the system 100, including but not limited to, user profiles as will be described in greater detail herein. It should be noted that although the database 280 is depicted as being configured locally to the computing device 205, in certain implementations the database 280 and/or various of the data elements stored therein can be stored on a computer readable memory or storage medium that is located remotely and connected to the system server 105 through a network (not shown), in a manner known to those of ordinary skill in the art.

A communication interface 255 is also operatively connected to the processor 210. The communication interface 255 can be any interface that enables communication between the system server 105 and external devices, machines and/or elements. In certain implementations, the communication interface 255 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

Figure 3:
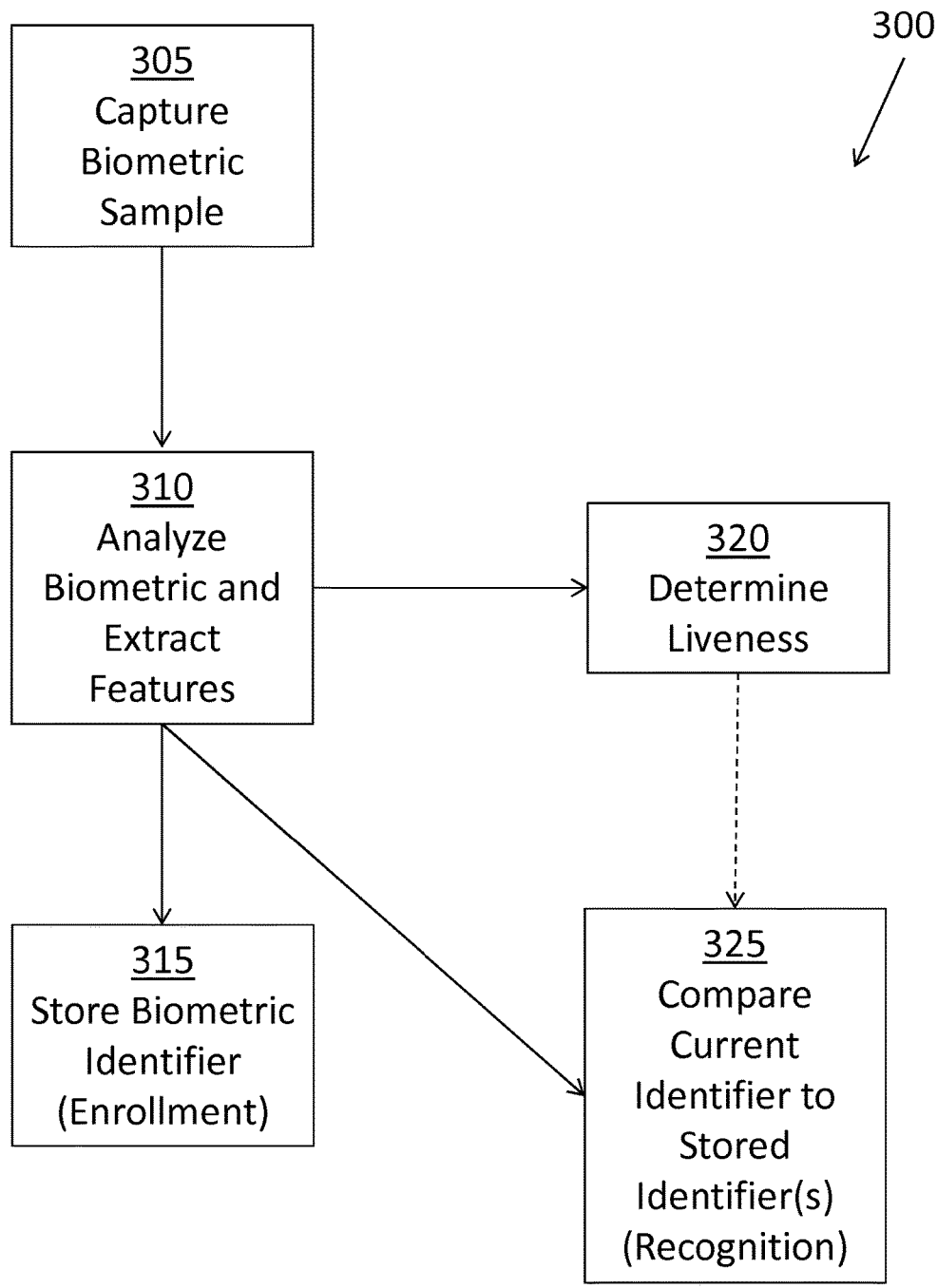
FIG. 3 is a flow diagram showing a routine for biometrics based user recognition and monitoring using wearable monitoring devices in accordance with at least one embodiment disclosed herein.

The operation of the system for biometrics based user recognition and monitoring using wearable monitoring devices 100 and the various elements and components described above will be further appreciated with reference to the method for biometrics based user recognition and monitoring using wearable monitoring devices as described below, in conjunction with FIGS. 3-4 with continued reference to FIGS. 1 and 2A-2D.

The processes further described herein are generally described from the perspective of the mobile device 101a operating in conjunction with the system server 105 based on data collected by the monitoring device 124, however, it should be understood that the exemplary processes can similarly be performed, in whole or in part, using the computing device 101b, the system server 105 or any combination of the foregoing devices.

As further described herein, the system for biometrics based user recognition and monitoring using wearable monitoring devices 100, facilitates the authentication of a user 125 according to a user's biometric features. In some implementations, identification and/or authentication according to a user's biometric features utilizes a user's biometric information in a two stage process depicted in FIG. 3. The first stage is referred to as enrollment. In the enrollment stage, at step 305, biometric samples (e.g., images representing biometric features, and/or other biometric data captured by the monitoring device 124 and/or the mobile device 101a) of appropriate biometric(s) is/are collected from an individual. These samples of biometrics are analyzed and processed to extract features (or characteristics) present in each sample at step 310. The set of features present in the biometric of an individual constitutes an identifier for the person. Similarly, extracted features can indicate whether the user is a live subject. These identifiers are then stored at step 315, to complete the enrolment stage. In the second stage, namely, identification or authentication, the biometric of the individual is measured and features from this biometric are extracted just like in the enrollment phase, as described in relation to steps 305 and 310, to obtain a current biometric identifier. If the goal is determining liveness at step 320, the features or characteristics captured can be analyzed to determine if they are representative of a live subject. If the goal is identification, then, at step 325, the biometric identifier is searched for in the database of stored identifiers (e.g., as generated in the enrollment phase or otherwise received from a repository of biometric data). If a match occurs, the identification of the individual is revealed, otherwise identification fails. If the goal is authentication, then, at step 325, the identifier generated in the second stage is compared with the identifier generated in the first stage for the particular person. If a match occurs, authentication is successful, otherwise authentication fails.

In the case of enrollment of a user according to the user's biometrics, in some implementations, one or more unique identifiers associated with a particular monitoring device 124 that is providing biometric data can be stored in association with the user identifier and/or a identifier for the authenticating mobile device hardware or software. These identifiers can be stored in a user profile maintained by the system server 105 thereby linking the enrolled user, the authenticating mobile device and the particular monitoring device 124 in a storage record.

It can be appreciated that a user is unlikely to wear a single article of intelligent clothing each day, and is likely to wear multiple articles of intelligent clothing either together or on separate occasions. It can also be appreciated that some articles of intelligent clothing might be shared by different people. Accordingly, in some implementations, user authentication using the mobile device 101a can be used to verify that the data collected by the monitoring device 124 at or around the time of authentication is properly associated with the user in storage thereby assuring the authenticity of the data collected by the monitoring device 124 integrated into clothing article(s) worn by the user and transmitted to the mobile device 101a. However, it can also be appreciated that users can be identified based on biometric information captured using the monitoring device 124 and/or the mobile device 101a without reliance on any prior association of the user with a particular article of clothing (e.g., monitoring device 124) or mobile device 101a, for instance by matching biometric information in a one-to-many fashion to identify individuals based solely on captured biometrics.

As noted above, each device can have has a distinctive ID that can be logged in the data store (for example, by system server 105) in association with one or more recognized user identities. Accordingly, an organized record of data and history of use by the users can be maintained by the system server. Similarly, the system maintained record can be used to track the transfer of an article of clothing that includes a monitoring device as it changes hands. For example, a distinctive ID can be associated with a manufacturer and can be used to track possession/ownership as the article having the monitoring device 124 is transferred to subsequent users and those users are recognized based on biometric information captured using the monitoring device 124 and provided to one or more enrolled mobile devices or the system server 105.

It can be appreciated that in some implementations, the system 100 and its components can be configured to maintain an authenticated history of a user's data, including any and all of the information collected by the monitoring device 124 and/or mobile device 101a. For example, records and details concerning the user's location data, movement data and/or health vital signs data (as collected by the monitoring device 124) in accordance with the disclosed embodiments can be stored by the mobile device 101a and/or system server 105 in one or more databases, thereby creating an audit trail or record entries based on the user data.

In some implementations, the user can be periodically prompted to authenticate with the system server for the purpose of authenticating any user data monitored using the monitoring device 124 and collected by the mobile device 101a. In addition or alternatively, the authentication/identification can occur automatically based on biometric data captured using the monitoring device 124 and without prompting the particular user via the mobile device.

In some implementations, the data audit trail stored can be accessible to the user via computing devices that are configured to interact with system server 105. For example, using a dashboard-like interface presented by an enrolled mobile device 101a or computing device 101b executing the client application or through a web-based user interface. Using the dashboard, the user can adjust settings, preferences and specify access rules for the data audit trails. For example, the user can review and specify other individuals and organizations who are authorized to have access to the user's audit trail data, or specific portions of the audit trails. In addition, the user can grant conditional access to the specified user according to that user's terms, including but not limited to, use restrictions and cost.

In one or more implementations of the present application, the system is configured to allow a user to share access to his or her digital data stored in his or her electronic device(s) or back-end user profiles with other users or entities (e.g., health organizations, marketing entities, social media friends, security organizations and the like), while maintaining ownership of the digital data and control of the data and the number and/or identity of the other users who can access and share access to the digital data. An exemplary system for peer-to-peer sharing of digital data in a secure and controlled manner is fully described in co-pending and commonly assigned U.S. Provisional Patent Application Ser. No. 14/836,557, entitled "SYSTEM AND METHODS FOR SECURE FILE SHARING AND ACCESS MANAGEMENT" filed Aug. 26, 2015, which is hereby incorporated by reference as if set forth in its entirety herein.

Figure 4:
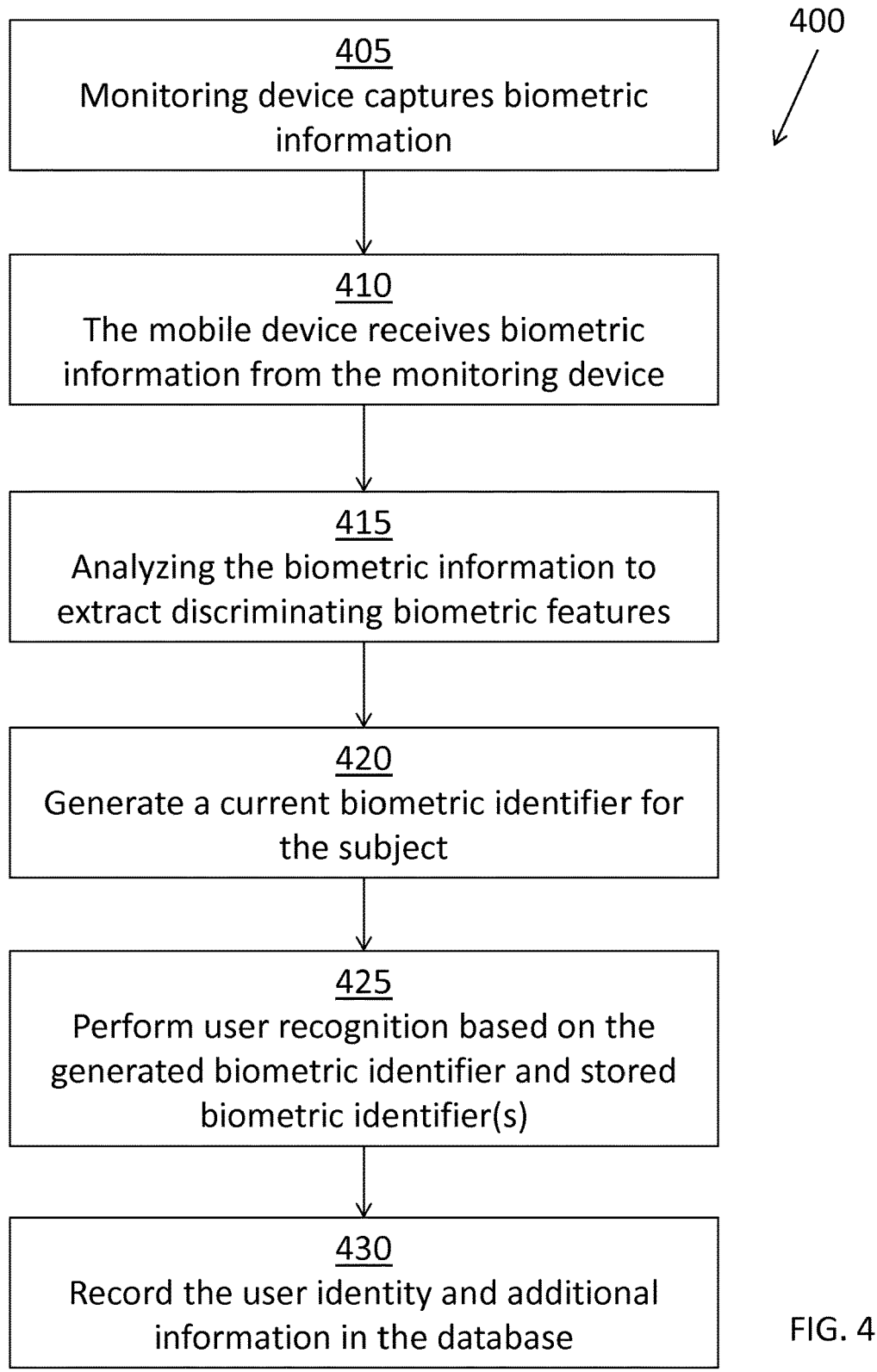
FIG. 4 is a flow diagram showing a routine for biometrics based user recognition and monitoring using wearable monitoring devices in accordance with at least one embodiment disclosed herein.

FIG. 4 illustrates an exemplary routine 400 for performing biometrics based user recognition and monitoring using wearable monitoring devices in accordance with one or more disclosed embodiments.

The process begins at step 405 where the monitoring device captures biometric information. Then at step 410, the mobile device 101a receives biometric information from the monitoring device 124. More specifically, the mobile device 101a, which is configured by executing the client app comprising one or more software modules including a communication module that is executed by the mobile device processor 110 and configures the processor to communicatively couple with the monitoring device 124. In some implementations, the mobile device and monitoring device can be configured to automatically pair, for instance based on settings defined during a prior enrollment process. In some implementations, the mobile device can wirelessly detect the monitoring device 124 and interrogate the monitoring device to establish a wireless connection without any prior association between devices. In other implementations, the monitoring device 124 can broadcast or transmit information for receipt by the mobile device. Once the mobile device and monitoring device are communicatively connected, the mobile device can read or receive biometric information captured by the monitoring device. The biometric information can be received in real-time, periodically as well as on-command or a combination of the foregoing. Accordingly, it can be appreciated that the captured information can be transmitted dynamically or batches of data can be stored by the monitoring device 124 and provided to the mobile device.

In addition to providing biometric information the wearable device 124 can provide additional information relating to the wearable device such as a device ID. In addition the wearable device can provide other data captured by the monitoring device in the course of use, for example and without limitation, environmental data and data relating to other individuals.

Then, at step 415, the received information is analyzed. More specifically, the mobile device 101*a*, which is configured by executing the client app comprising one or more software modules including an analysis module that, when executed by the mobile device processor 110, configures the processor to analyze the data received from the monitoring device 124 and extract biometric features.

Exemplary systems and methods for capturing biometric information, generating biometric identifiers, performing biometric-based authentication and determining liveness are further described herein and in co-pending and commonly assigned U.S. patent application Ser. No. 14/201,499, entitled "SYSTEM AND METHOD FOR GENERATING A BIOMETRIC IDENTIFIER" filed Mar. 7, 2014; U.S. patent application Ser. No. 14/276,753, entitled "SYSTEM AND METHOD FOR AUTHORIZING ACCESS TO ACCESS-CONTROLLED ENVIRONMENTS" filed May 13, 2014; U.S. Patent Application Ser. No. 62/041,803, entitled "SYSTEMS AND METHODS FOR DETERMINING LIVENESS" filed Aug. 26, 2014; U.S. Patent Application Ser. No. 62/041,964, entitled "SYSTEMS AND METHODS FOR SECURE FILE SHARING AND ACCESS MANAGEMENT" filed Aug. 26, 2014; U.S. Provisional Patent Application Ser. No. 62/112,961, entitled "SYSTEMS AND METHODS FOR PERFORMING FINGERPRINT BASED USER AUTHENTICATION USING IMAGERY CAPTURED USING MOBILE DEVICES" filed Feb. 6, 2015; U.S. Patent Application Ser. No. 62/129,246, entitled "SYSTEM AND METHODS FOR BIOMETRICS BASED USER IDENTIFICATION" filed on Mar. 6, 2015; U.S. Patent Application Ser. No. 62/129,277, entitled "SYSTEMS AND METHODS FOR PERFORMING IRIS IDENTIFICATION AND VERIFICATION USING MOBILE DEVICES" filed Mar. 6, 2015; each of which is hereby incorporated by reference as if set forth in its respective entirety herein.

Because a mobile device can be configured to communicate and operate with any number of different types of monitoring devices that capture various different types of biometric information that can be monitored or used for user recognition according to different biometric authentication modalities, the mobile device can be configured to identify the type of the biometric data received from the monitoring device among a plurality of possible types of biometric data (e.g., heart-rate measurements, pulse measurements, facial imagery, iris imagery, fingerprint imagery and the like). The particular type of data received and what it represents can be determined based on an analysis of the received monitoring data to identify characteristics indicating what particular type it is. In addition, the type can be determined based on information identifying the monitoring device, such as a device ID and an associated device type, and/or information provided by the monitoring device that specifies the type of biometric information captured and sensor device used to capture the biometric data. It can be appreciated that the mobile device can be configured to analyze the biometric data and extract biometric features according to the so identified type and can therefore be used with various sensor types and biometric recognition systems.

Then at step 420, the mobile device generates a biometric identifier for the user that represents the extracted biometric features and, at step 425, the mobile device performs user recognition based on the generated biometric identifier. In the case of performing biometric recognition of a user, the biometric information can be analyzed to generate a current biometric identifier for the user, for instance, a template characterizing the user's unique biological rhythms or biometric features.

Then at step 425, If the mobile device is performing user authentication, the mobile device can first determine from on a stored record of enrolled monitoring devices, whether a device identifier received from the monitoring device 124 has been previously associated with a particular user profile. If the monitoring device is associated with a particular user, the mobile device can authenticate the user by comparing the current biometric template to a previously stored biometric template for the particular user.

If the mobile device is performing identification, the mobile device can authenticate the user by comparing the current template to a plurality of stored biometric identifiers so as to identify the individual from many candidate individuals.

In addition or alternatively to being authenticated solely based on the information captured by the monitoring device, the user can be recognized based on biometric information captured using the mobile device. For instance, as described herein, the user can be authenticated based on imagery of the one or more facial features (e.g., iris, periocular and face), fingerprints and the like that is captured by the mobile device using an associated camera.

Upon positive biometrics based user recognition, at step 425, the identity of the user and any additional information that was captured by the wearable device and provided to the mobile device or captured by the mobile device in the course of user recognition and/or in relation to the authentication can be recorded in a database. For instance, environmental information captured by the monitoring device (e.g., location, position, orientation and environmental data) can be recorded by the mobile device so as to create a log of the user recognition and store the data provided by the wearable device in an authenticated manner. It can also be appreciated that such additional information can be used during the user authentication as additional security checks to the biometric authentication (e.g., location data can be compared to previously recorded location data to identify any abnormal activity). Similarly information captured by the mobile device such has a GPS location of the mobile device during the authentication can be captured so as to associate a particular location to the logging of the data from the monitoring device. It can be appreciated that such information can be recorded locally on the mobile device and/or remotely, for instance in a remote database maintained by the system server 105. Moreover, as noted previously, it can be appreciated that user recognition can be performed by the mobile device alone or in combination with the system server.

Although the foregoing example has been described in the context of authenticating the wearer of the wearable device, it can be appreciated that wearable devices can be configured to detect and read biometric information for individuals that are not wearing the monitoring device 124, yet are in proximity to the monitoring device. For instance the wearable device can include sensors exposed on an external surface of the wearable device so as to capture biometrics of passers-by. For example, sensors can be configured to capture IR, NIR or visible light imagery of proximate individuals and this imagery can be recorded by the wearable device 124 until it is later coupled to a configured computing device (e.g., mobile device 101*a* or computing device 101*b*) and the stored information can be uploaded to the computing device for recordation and analysis as described above.

In the implementation where the monitoring device captures biometric data over a period of time and stores the information, the monitoring data can be provided in batch form to a mobile device. Accordingly, the mobile device can be configured to identify the subsets (e.g., segments) of the captured data that correspond to separate capture events. For instance, the monitoring device can sporadically capture monitoring data of the wearer as well as passers-by when they are detected and, as such, the batch of monitoring data including each monitoring event can be separated into individual segments. The mobile device can be configured to identify discrete segments by analyzing the data to identify breaks in data captures, for instance, based on associated time-stamps, locations, environmental conditions and the like. In addition or alternatively, the mobile device can be configured to analyze the captured biometric information and compare the information to identify differences indicating that the data corresponds to different individuals. In addition or alternatively, the monitoring device can also specify in the recorded information the circumstances surrounding the data capture event so as to indicate whether or not the segment of captured information relates to the wearer of the monitoring device, or another individual, or was taken under different circumstances and the like.

It can also be appreciated that in the event that multiple segments of data are received, the mobile device can be configured to extract features, generate biometric identifiers and perform recognition on each segment so as to generate a record of the event in the storage and associate that record with the identified individual. Similarly, in the situation where the subject identified from a particular segment of data is not the wearer of the device, the record can also reflect the identity of the wearer so as to record an association between the wearer, the identified passer-by and other information relating to the monitoring event.

Although routine 400 has been described in relation to a mobile device performing user authentication in conjunction with the system server 105, in some implementations the captured record of biometric and environmental data can be provided by the monitoring device 124 to a stationary computing device 101*b* that is configured to receive and coordinate recognition of individuals based on data captured from any number of different monitoring devices. For instance, in some implementations in some implementations, the computing devices are dedicated for use in a particular location, for instance, an office or store affiliated with an enterprise entity so as to recognize and monitor users visiting that location. As such, each computing device is preferably configured to perform enrollment and/or recognition for a plurality of possible users visiting a particular facility. The computing device can be configured to detect the presence of compatible monitoring devices irrespective of whether such devices have been previously detected and/or paired with the particular computing device. Upon establishing a successful connection with a proximate monitoring device 124 (e.g., as described in relation to step 405), the computing device can capture the information provided by the monitoring device (e.g., as described in relation to step 410). As noted above, the information received from the monitoring device can concern the particular individual wearing the monitoring device (e.g., the wearer's biometric information, environmental information, location data and the like) and, in addition or alternatively, captured information relating to individuals who were proximate to the monitoring device 124. Upon receipt of the information, the information can be analyzed by the computing device 101*a* and/or the system server 105 to recognize the wearer or any proximate individuals and log the corresponding monitoring data.

In some implementations, the remote system server can communicate with and acquire the captured sensor data directly from the monitoring devices and without reliance on the mobile device 101*a* or computing device 101*b*. For instance, the system server can be configured to communicate with and capture data from the monitoring devices through existing communications networks or distributed communications routers that receive and feed the data captured by the monitoring device to the system server. In addition, the system server can be configured to, as described above, analyze the biometric information to perform biometric recognition and monitoring and analyze the additional data to determine an associated location and time of detecting the person identified. Accordingly, it can be appreciated that the system server, operating directly with the monitoring device or in conjunction with distributed intermediary devices such as routers and the like, can quickly effectuate real-time statistics and data analysis with respect to an identified individual, their location and user activity, and perform dynamic target acquisition and monitoring so as to automatically make actionable decisions including initiating security and/or safety measures or initiating direct marketing actions relative to a target individual being monitored.

It can be appreciated that wearable devices can be configured to share, or not share information with compatible computing devices according to a variety of data sharing and security settings. Similarly, the computing devices which receive and process the information from monitoring devices can be configured according to access rules and settings that restrict the collection and sharing of sensitive information. For instance, the mobile devices 101*a* and computing device 101*b* can be configured to discriminately connect with particular monitoring devices (e.g., only devices having been enrolled in association with the mobile device), indiscriminately communicate with any monitoring device that is in range and is enabled to provide captured information, or according to other similar accessibility rules.

In some implementations, for example, in the case of a computing device in a stationary location, after detecting a monitoring device can transmit the data read from the monitoring device to the system server 105 for recognition of the user. Based on the identification, the system server can log the identification and related data such as a location of the computing device or location provided by the monitoring device. In some implementations, a computing device can be geo-fenced such that it can only be used to recognize and/or monitor within a prescribed area based on a current device position determined from hardware such as a GPS locator. The area can be limited to, say, a particular facility and can be adjusted to any greater geographic area.

In addition, the system server can be configured to, based on the identification and location, notify one or more mobile devices in proximity to the computing device or user location. For instance, in an exemplary security implementation, a mobile device associated with security personnel can be notified of the particular individual's identity and information relating to the user's identity can be provided such as a picture, name, etc. In an exemplary marketing implementation, a store attendant having an enrolled mobile device can be notified of the identified individual, can be provided the location of the computing device and can provide the attendant with a picture of the identified individual so the attendant can approach the individual and assist with a sale. Similarly, in a safety related implementation, biometric information relating to a particular user's vital signs captured by the monitoring device 124 and provided to the computing device 101b can be monitored by the computing device 101b and/or the system server 105. In the event of detecting an abnormal and potentially life threatening condition based on the biometric information, the computing device 101b and/or system server 105 can transmit a notification to emergency personnel that includes information concerning the monitored individual's identity, biometric data and location such that the emergency personnel can provide assistance.

The exemplary systems and methods for biometric recognition and monitoring based on biometric information captured using wearable electronic devices can operate in a variety of modes. These modes can include a personal mode in which a user wearing any number of monitoring devices (either at the same time or separately) can, in conjunction with an enabled mobile device that is configured to be integrated with the back-end authentication and monitoring infrastructure, can record personal biometric information and environmental data in a secure and authenticated manner.

The modes can also include a surveillance mode. Surveillance mode can include mobile devices (e.g., 101a) and other stationary computing device nodes (e.g., 101b) that are configured to communicate with and capture or receive information recorded by a variety of different monitoring devices irrespective of the particular wearer of the monitoring device, utilize the received information for user recognition as well as monitoring. Surveillance mode can also include a configuration in which the monitoring device (e.g., 124) is configured to surveil the surrounding area and capture biometric information for proximate individuals other than the actual wearer of the monitoring device and record/store the captured information at least until establishing connection to an enabled computing node (e.g., mobile device 101a or computing device 101b) and provide the surveillance data to the node for further processing (e.g., recognition, monitoring and/or reporting). Accordingly, the system 100 can be configured to establish a distributed biometrics based monitoring mesh network in which mobile monitoring devices 124 capture information concerning device wearers and/or proximate individuals and additional data as they move and periodically connect to and relay the captured information to mobile and stationary computing devices that facilitate biometrics based user recognition, monitoring and data logging in conjunction with the remote back-end server infrastructure.

The subject matter described above is provided by way of illustration only and should not be construed as limiting. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, as set forth in each and any of the following claims.

What is claimed is:

1. A computer implemented method for performing user recognition with a mobile computing device according to biometric information captured by a monitoring device worn by a user, the monitoring device being one of a plurality of different monitoring devices worn by the user at the same time or at different times, the method comprising:
   detecting, by the mobile computing device including a processor, a wireless transceiver, a storage medium, and instructions stored on the storage medium and executing in the processor, a wearable monitoring device in range of the wireless transceiver;
   establishing, by the processor using the transceiver, a wireless communication link with the monitoring device;
   receiving, by the processor over the wireless communication link, a monitoring device ID that distinctively identifies the monitoring device, and monitoring data captured by the monitoring device, wherein the monitoring data includes captured biometric data of at least one subject;
   analyzing, by the processor, at least the received biometric data, the analysis including:
      identifying, by the processor based on the device ID, the respective type of biometric data captured by the monitoring device,
      extracting, by the processor according to the identified type of biometric data, biometric features of a type that is suitable for performing biometric user recognition, and
      generating, by the processor using the extracted biometric features, a biometric identifier;
   comparing the received device ID to a record of monitoring device IDs stored in a database in association with one or more user identities;

determining, based on the comparison, whether the monitoring device is associated with a particular user identity;

biometrically recognizing a user identity, by at least one or more of the mobile device processor and a remote server computing device in communication with the mobile device over a network, based on the biometric identifier, the recognizing step including:

if, at the determining step, the device ID is determined to be associated with the particular user identity:

comparing the biometric identifier to an enrolled biometric identifier stored in the database and associated with the particular user identity, and identifying the user identity in response to a successful match of the biometric identifier to the enrolled biometric identifier;

if, at the determining step, the device ID is not determined to be associated with the particular user identity:

comparing the biometric identifier to a plurality of enrolled biometric identifiers stored in the database, wherein the plurality of enrolled biometric identifiers are associated with respective user identities, identifying the user identity in response to a successful match of the biometric identifier to an enrolled biometric identifier that is associated with the user identity, and in the absence of a successful match of the biometric identifier to any enrolled biometric identifier, capturing, with the processor using a camera of the mobile computing device, at least one image of the user, extracting, with the processor from the at least one image, biometric features of the user depicted in the one or more images, generating, with the processor, an image-based biometric identifier based on the extracted biometric features of the user depicted in the one or more images, comparing the image-based biometric identifier to at least one enrolled image-based biometric identifier that is stored in the database in association with a mobile device identifier and the user identifier, and identifying the user identity in response to a successful match of the image-based biometric identifier to the at least one enrolled image-based biometric identifier;

creating, by the remote server computing device in response to biometrically recognizing the user identity and according to a mobile device identifier, a record entry in a user profile stored in the database, wherein the user profile is uniquely associated with the user identity and the mobile device identifier, and wherein the record entry includes a result of the recognizing step and the device ID and at least a portion of the monitoring data captured by the monitoring device, whereby storing record entries in the user profile according to the mobile device identifier serves to compile monitoring data associated with the user identity and the user's mobile device irrespective of which of the plurality of monitoring devices is used to capture the monitoring data; and transmitting, by the remote server over a network to a remote computing device, a confirmation indicating that the record entry was created and the result of the identifying step.

2. The method of claim 1, wherein the monitoring data includes additional data captured by the monitoring device during the capture of the biometric data including one or more of: a location, orientation, position and time; and wherein creating the record comprises storing one or more portions of the additional data in the record.

3. The method of claim 1, wherein the monitoring data is provided to the mobile device as a batch of monitoring data captured by the monitoring device over a period of time, and further comprising:

analyzing, by the processor, the monitoring data, and identifying segments of the biometric data that correspond to different subjects; and performing at least the analyzing and recognizing steps for each of the segments of data that correspond to different subjects.

4. The method of claim 1, wherein the recognizing step further comprises transmitting, by the processor to the remote server computing device, the biometric identifier and the device ID, and wherein the remote server performs the steps of comparing the biometric identifier and identifying the user.

5. The method of claim 4, wherein the confirmation is transmitted by the remote server to another computing device having a location that corresponds to a location of one or more of the mobile device and the monitoring device, and wherein the confirmation includes the user identity.

6. The method of claim 1, further comprising:

monitoring, by one or more of the mobile device and the remote server, the biometric data;

identifying health characteristics of the subject based on the monitoring; and storing, in the record, one or more of the health related characteristics and the biometric data.

7. A system for user recognition according to biometric information captured by a monitoring device worn by a user, the monitoring device being one of a plurality of different monitoring devices worn by the user at the same time or at different times, comprising:

a remote server computing device;

a database accessible by the remote server, the database including enrolled biometric identifiers associated with respective user identities and respective mobile computing device identifiers that uniquely identify respective devices used by respective users;

a mobile computing device having a processor, a wireless transceiver, a storage medium, and instructions stored on the storage medium and executing in the processor, the one or more software modules further including:

a biometric capture module that executes in the processor and configures the processor to, using an associated camera device, capture at least one image of the user;

a communication module executing in the processor and configuring the processor to, using the transceiver, establish a wireless communication link with the monitoring device, receive a monitoring device ID that distinctively identifies the monitoring device and monitoring data captured by the monitoring device including biometric data of at least one subject;

an analysis module executing in the processor and configuring the processor to:

identify the respective type of biometric data captured by the monitoring device based on the device ID,
according to the type of biometric data identified based on the device ID, analyze at least the received biometric data,
extract biometric features, and
generate a biometric identifier using the extracted biometric features, and
wherein the analysis module further configures the processor to extract, from the at least one image, biometric features of the user depicted in the at least one image and generate an image-based biometric identifier based on the extracted biometric features;
an authentication module executing in the processor and configuring the processor to, in coordination with the remote server computing device, compare the received device ID to a record of monitoring device IDs stored in a database in association with one or more of the user identities to determine whether the monitoring device is associated with a particular user identity, and identify a user identity that corresponds to the biometric identifier by:
if, based on the comparison of the received device ID to the record of monitoring device IDs, the device ID is determined to be associated with the particular user identity:
comparing the biometric identifier to an enrolled biometric identifier stored in the database and associated with the particular user identity, and
identifying the user identity in response to a successful match of the biometric identifier to the enrolled biometric identifier; and
if, based on the comparison of the received device ID to the record of monitoring device IDs, the device ID is not determined to be associated with the particular user identity:
comparing the biometric identifier to a plurality of enrolled biometric identifiers stored in the database, wherein the plurality of enrolled biometric identifiers are associated with respective user identities,
comparing the image-based biometric identifier to at least one enrolled image-based biometric identifier that is stored in the database in association with an identifier for the mobile device and the user identity, and
identifying the user identity in response to either a successful match of the biometric identifier to an enrolled biometric identifier that is associated with the user identity or a successful match of the image-based biometric identifier to the at least one enrolled image-based biometric identifier; and
a database module executing in the processor and configuring the processor to, in coordination with the remote server, create a record that includes a result of identifying the user identity and the device ID and at least a portion of the monitoring data captured by the monitoring device, and store the record in a user profile in the database according to the mobile device's identifier, and wherein the user profile is uniquely associated with the user identity and the mobile device.

8. The system of claim 7, further comprising:
the monitoring device, wherein the monitoring device includes a microprocessor, a wireless transmitter and one or more microsensors configured to measure the biometric data and additional data including one or more of: a location, orientation, position and time.

9. The system of claim 8, wherein the microsensors are MEMS sensor devices, and wherein the monitoring device is incorporated into a wearable article of clothing.

10. The system of claim 8, wherein the database module further configures the processor to store one or more portions of the additional data in the record.

11. The system of claim 7, wherein the monitoring data is received by the mobile device as a batch of monitoring data captured over a period of time, and wherein the analysis module further configures the processor to:
analyze the monitoring data to identify segments of the biometric data that correspond to different subjects, and
for each of the segments, extract respective biometric features, generate a respective biometric identifier and identify a user identity that corresponds to the respective biometric identifier.

12. The system of claim 7, wherein the analysis module further configures the processor to monitor the biometric data and identify health characteristics of the subject based on the monitoring, and store, in the record, one or more of the identified health related characteristics and the biometric data.

* * * * *